(12) United States Patent
Ellis et al.

(10) Patent No.: US 7,596,639 B2
(45) Date of Patent: Sep. 29, 2009

(54) SKIP MASK TABLE AUTOMATED CONTEXT GENERATION

(75) Inventors: Jackson Lloyd Ellis, Fort Collins, CO (US); Kurt Jay Kastein, Fort Collins, CO (US); Lisa Michele Miller, Fort Collins, CO (US); Praveen Viraraghavan, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 516 days.

(21) Appl. No.: 10/931,668

(22) Filed: Sep. 1, 2004

(65) Prior Publication Data
US 2006/0047865 A1    Mar. 2, 2006

(51) Int. Cl.
*G06F 13/28* (2006.01)
*G06F 13/00* (2006.01)
(52) U.S. Cl. .......................................... 710/22; 710/35
(58) Field of Classification Search .................... 710/22
See application file for complete search history.

(56) References Cited

U.S. PATENT DOCUMENTS 5,572,654 A * 11/1996 Coelho ........................ 715/526
6,449,666 B2 * 9/2002 Noeldner et al. .............. 710/23
2001/0032292 A1 * 10/2001 Hoskins et al. ............. 711/112

OTHER PUBLICATIONS

U.S. Appl. No. 10/914,926, filed Aug. 9, 2004, Ellis et al.
U.S. Appl. No. 10/910,000, filed Aug. 3, 2004, Ellis et al.

* cited by examiner

*Primary Examiner*—Henry W. H. Tsai
*Assistant Examiner*—John B Roche
(74) *Attorney, Agent, or Firm*—Yee & Associates, P.C.

(57) ABSTRACT

Skip logic is provided in a storage controller that informs a direct memory access (DMA) context list manager of consecutive ones and zeroes in a skip mask table. The DMA context list manager then manages data counters and location pointers based on the number of consecutive ones and the number of consecutive zeroes. For writes and non-cached reads, the number of zeroes is used to adjust a logical sector address without actually moving data. For cached reads, the number of zeroes is used to adjust the logical sector address and a host address pointer. The DMA context list manager also determines an instruction length based on a number of consecutive ones and issues one or more instructions for each group of consecutive ones and subtracts the instruction lengths from the overall transfer length until the transfer is complete.

39 Claims, 7 Drawing Sheets

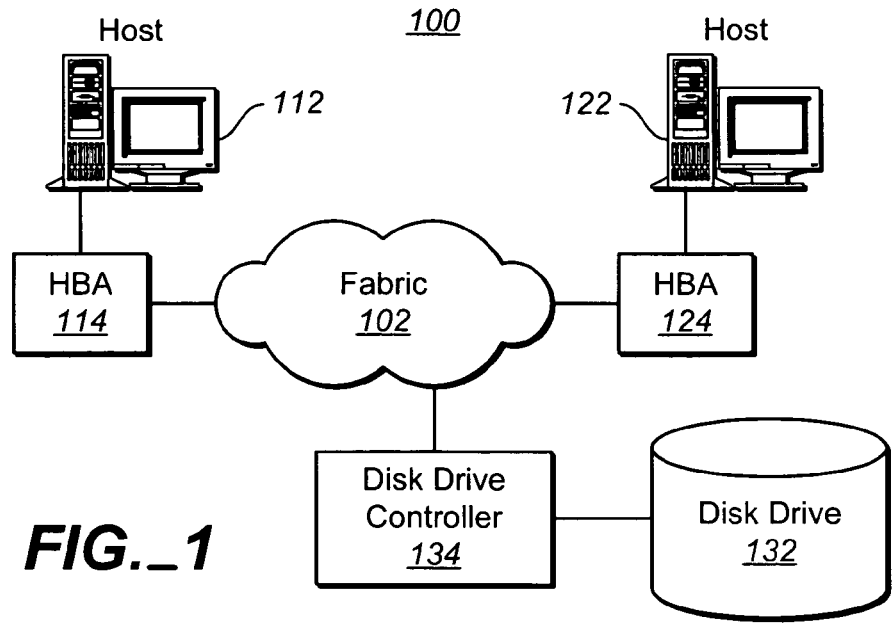
FIG._1
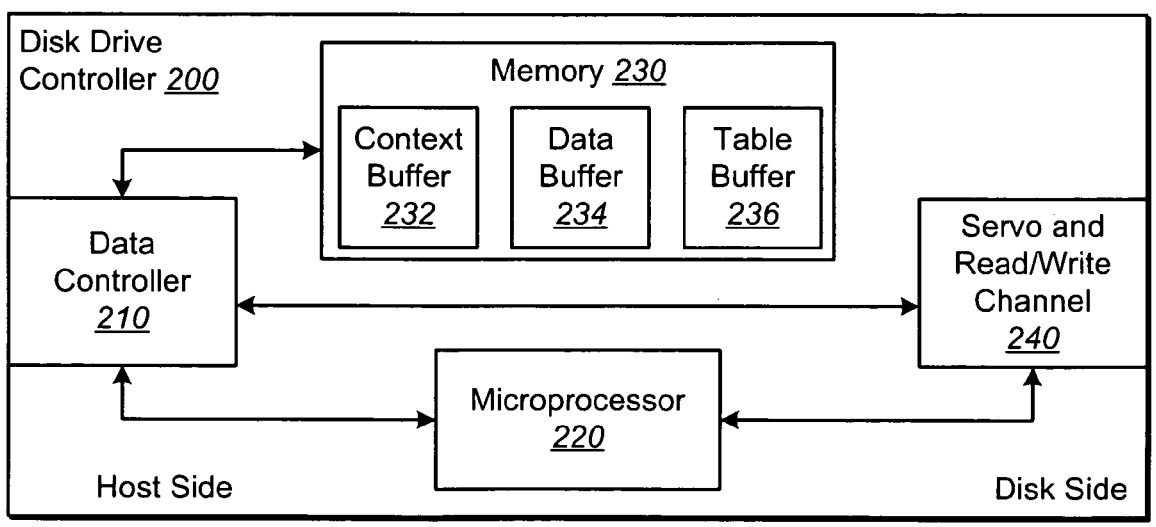
FIG._2

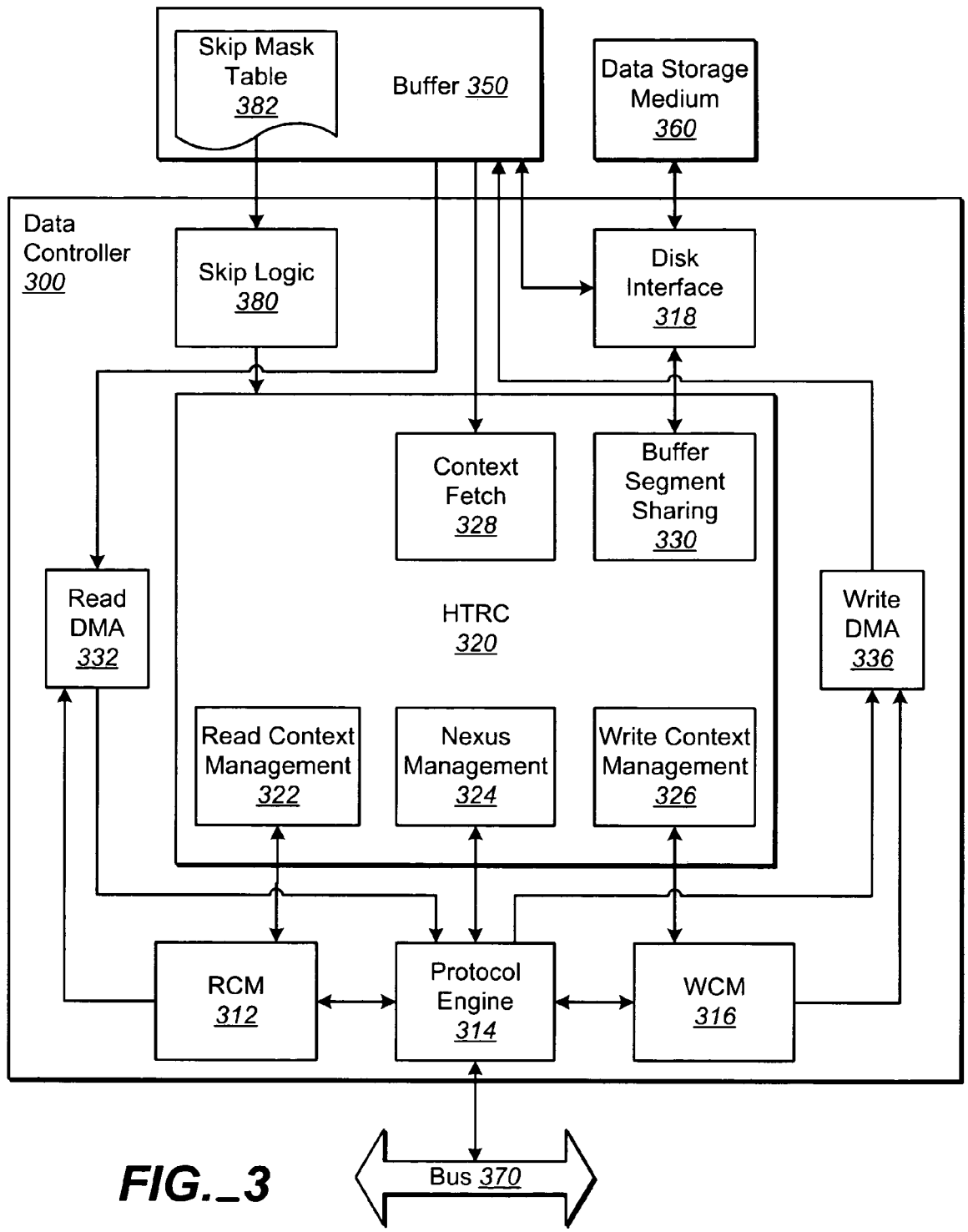
FIG._3

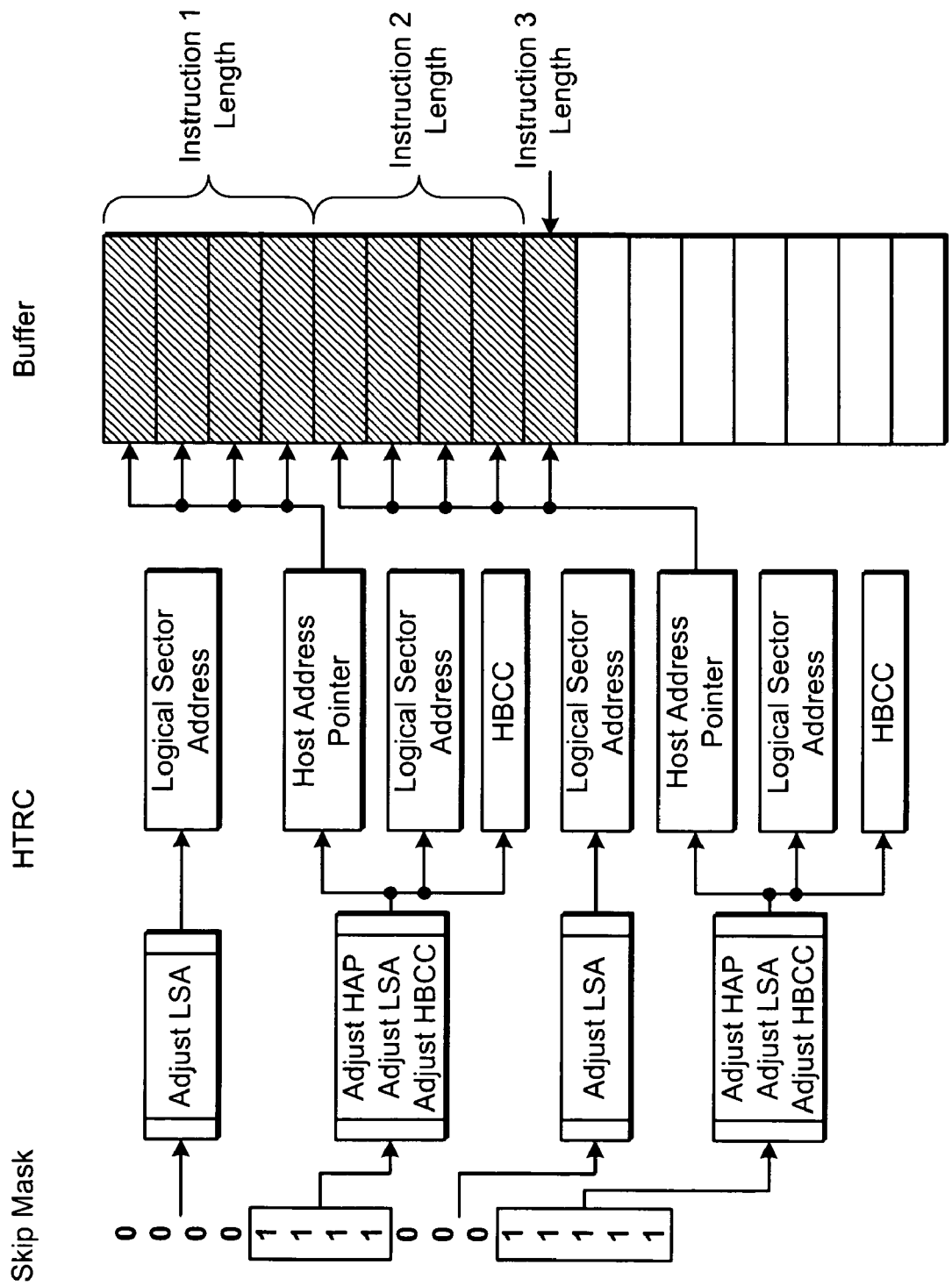
FIG._4A

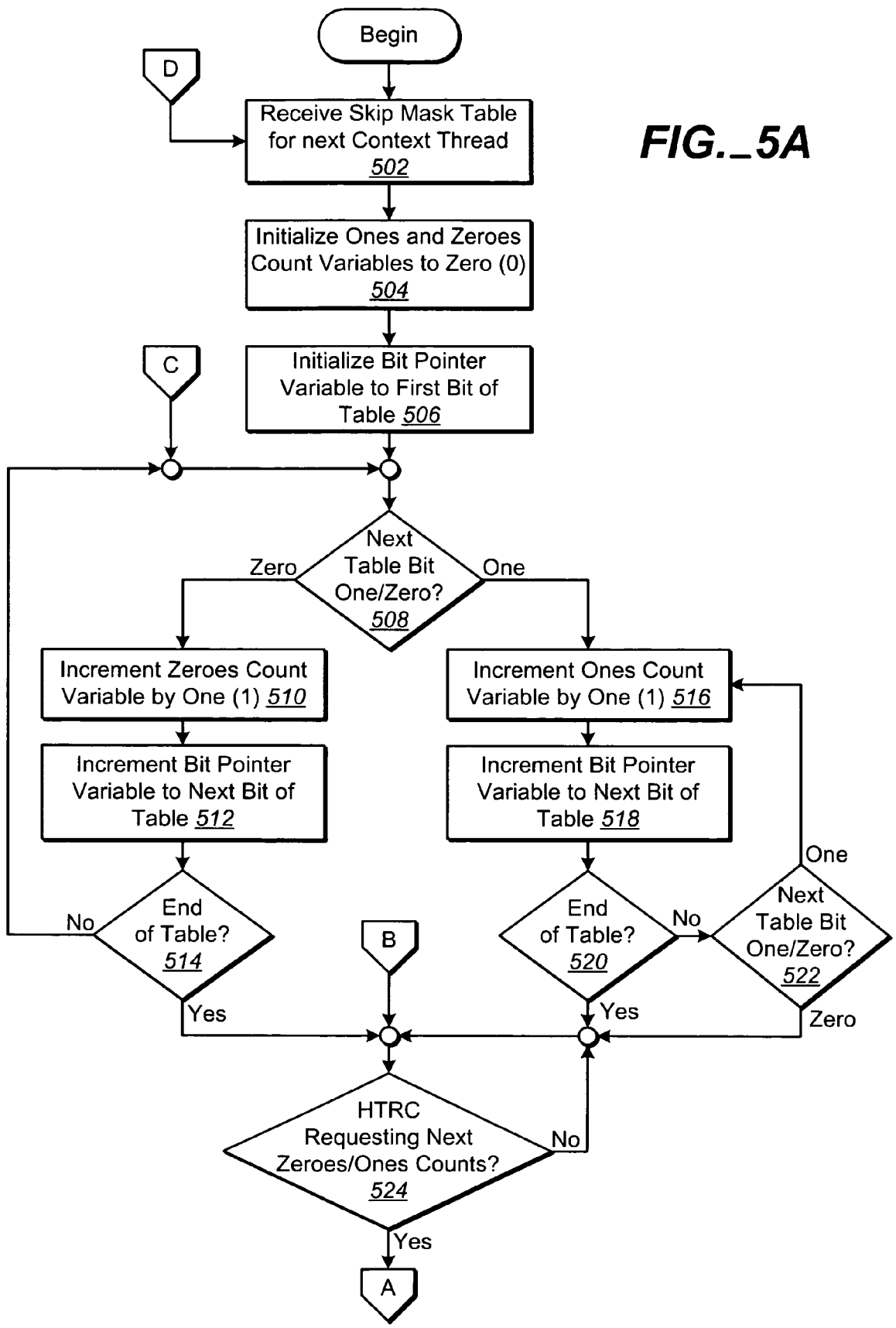
FIG._5A

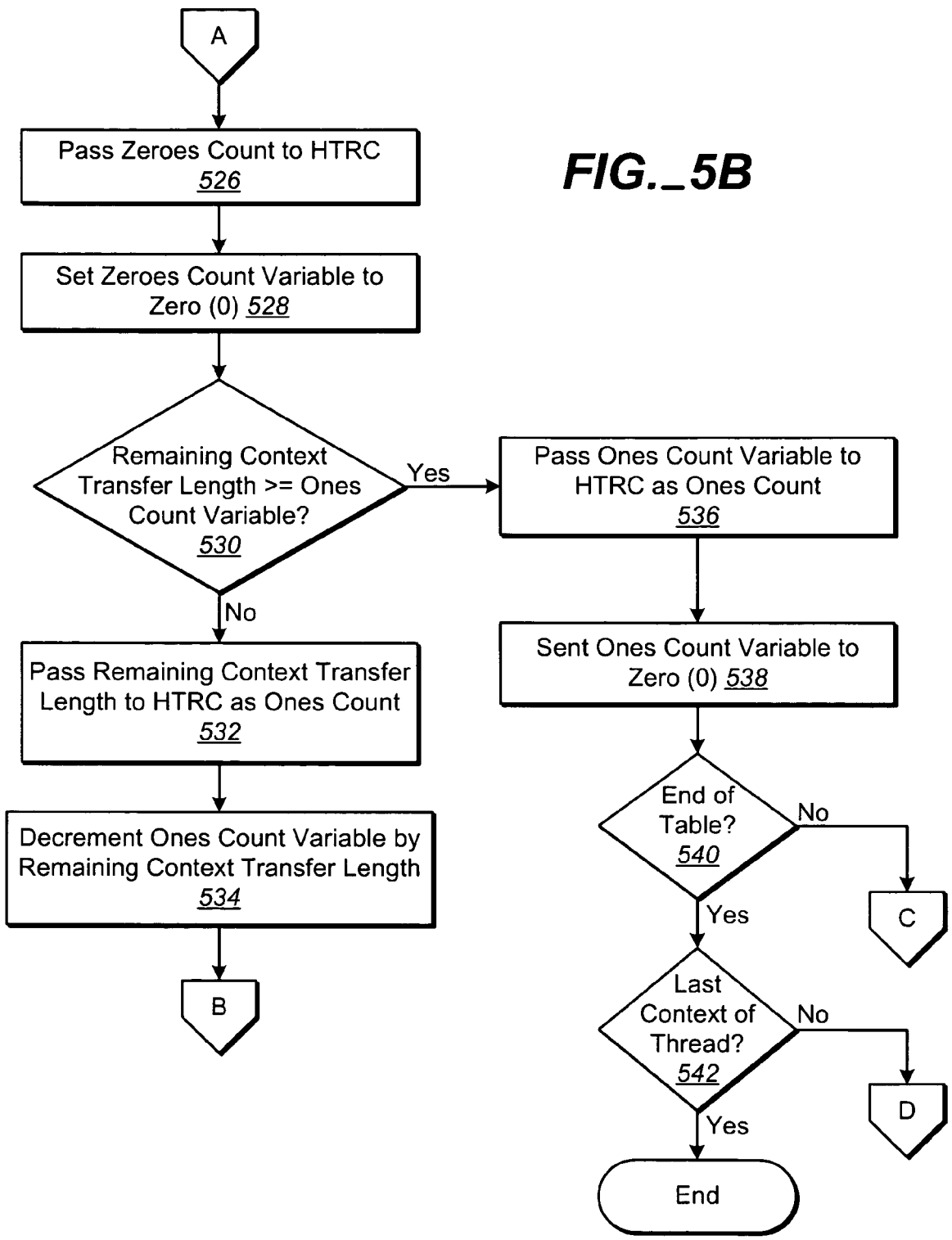
FIG._5B

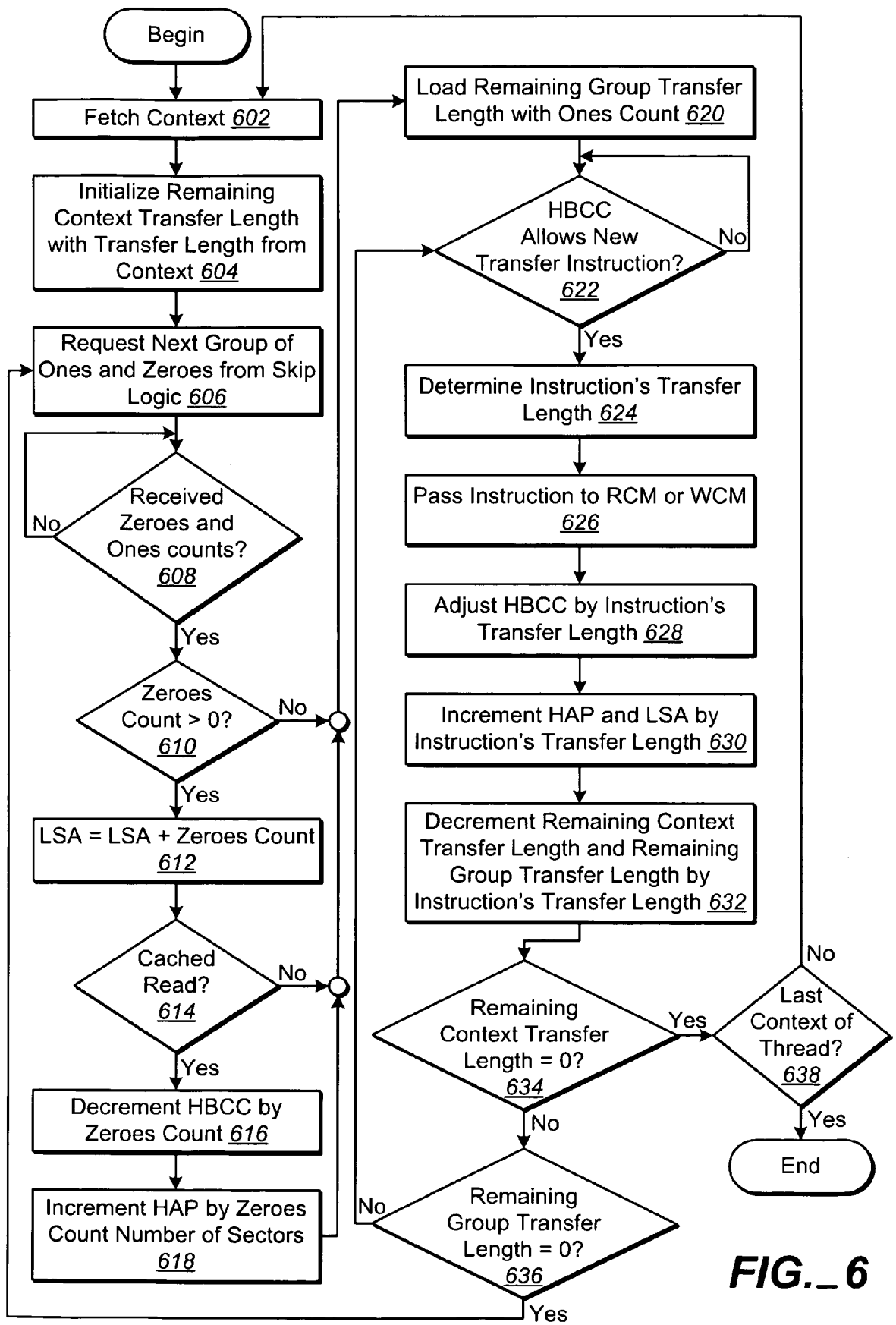
FIG._6

SKIP MASK TABLE AUTOMATED CONTEXT GENERATION

BACKGROUND OF THE INVENTION

1. Technical Field

The present invention is directed generally toward improved data storage. More particularly, the present invention relates to a method and apparatus in a data controller for retrieving, evaluating, and processing a context that describes a direct memory access request and includes a skip mask table.

2. Description of the Related Art

One function of a data processing system is to move data based on a request from an external system. For efficient operation, it is important that the data processing system maintain data movement between a requestor and a final storage medium without excessive processing overhead, whether the final storage medium is a disk drive, cd-rom drive, tape drive, flash memory or the like.

There are many approaches to controlling the movement of data based on a request from an external system. One approach is to use a microprocessor to process every boundary in the data flow via service interrupts. For example, when a request is made, an interrupt can be asserted to communicate to the microprocessor that a new command is available. The microprocessor can then evaluate the command and determine the size of the data transaction. If the request is a write command, the microprocessor allocates space to store the data, in either an internal or an external storage medium, and then processes the incoming data. A similar process is followed to read data from a storage medium in response to a read command.

Data may be moved between a requesting host device and a storage device using direct memory access (DMA). Direct memory access uses specialized circuitry or a dedicated microprocessor to transfer data from memory to memory. For example, data may be moved from a buffer in a host bus adapter to a buffer in the storage device. The characteristics of a DMA transfer are typically defined using a context, which includes all of the information that is necessary in order for a storage controller included in the storage device to program a DMA transfer, whether that transfer is a read or a write. A context typically describes whether the transfer is to be a read or write to the drive, the length of the data to be transferred, and the current location of the data to be read or the space in the buffer where the data is to be written. The context can also specify to release some of the data in the buffer in the storage device for reads before starting to transfer data. This is useful in case the DMA request skips a small amount of data between two commands. In this case, the DMA can transfer the data for the first command represented by a first context, then jump over the data to be skipped based on a release count in the second context, then transfer the data for the second command represented by the second context.

In some implementations, a host device may wish to perform a read from or a write to non-consecutive locations. For example, a host device may write video data that is to be interleaved with audio data. For this purpose, a DMA request may also include a skip mask, also referred to as a skip mask table. A skip mask table is a series of ones and zeroes that indicate whether consecutive memory addresses or data locations, also referred to as logical blocks or sectors, are to be transferred. The target device may use this table to determine which locations are valid and which locations need to be skipped. The microprocessor of the storage controller must then create separate contexts for each group of valid locations based on the skip mask table. The storage controller must then manage a list of contexts that is different from the contexts received from the host device.

As an example, consider a table that includes 2048 bits. A DMA request from a host device may indicate to write 1024 sectors of data with a skip mask table of 256 bytes, where each byte has the following binary bit-pattern: "10101010." In this example, the storage controller must create 1024 separate contexts that transfer one sector each. This is a worst-case scenario, but it illustrates the inefficiency of using the microprocessor resources at the storage controller to create a list of contexts based on the skip mask table.

SUMMARY OF THE INVENTION

The present invention recognizes the disadvantages of the prior art and provides skip logic in a storage controller that informs a direct memory access (DMA) context list manager of consecutive ones and zeroes in a skip mask table. The DMA context list manager then manages data counters and location pointers based on the number of consecutive ones and the number of consecutive zeroes. For writes and non-cached reads, the number of zeroes is used to adjust a logical sector address without actually moving data. For cached reads, the number of zeroes is used to adjust the logical sector address and a host address pointer. The DMA context list manager also determines an instruction length based on a number of consecutive ones and issues an instruction for each group of consecutive ones and subtracts the instruction length from the overall transfer length until the transfer is complete.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts a pictorial representation of a storage area network in which exemplary aspects of the present invention may be implemented;

FIG. 2 is a block diagram illustrating a disk controller in accordance with an exemplary embodiment of the present invention;

FIG. 3 illustrates a device included within a disk data controller in which exemplary aspects of the present invention may be implemented;

FIGS. 4A and 4B illustrate example data transfers with skip masks in accordance with a preferred embodiment of the present invention;

FIGS. 5A and 5B depict a flowchart, which illustrates the operation of skip logic in accordance with an exemplary embodiment of the present invention; and FIG. 6 is a flowchart illustrating operation of a host thread retrieval channel in accordance with an exemplary embodiment of the present invention.

DETAILED DESCRIPTION

Figure 4B:
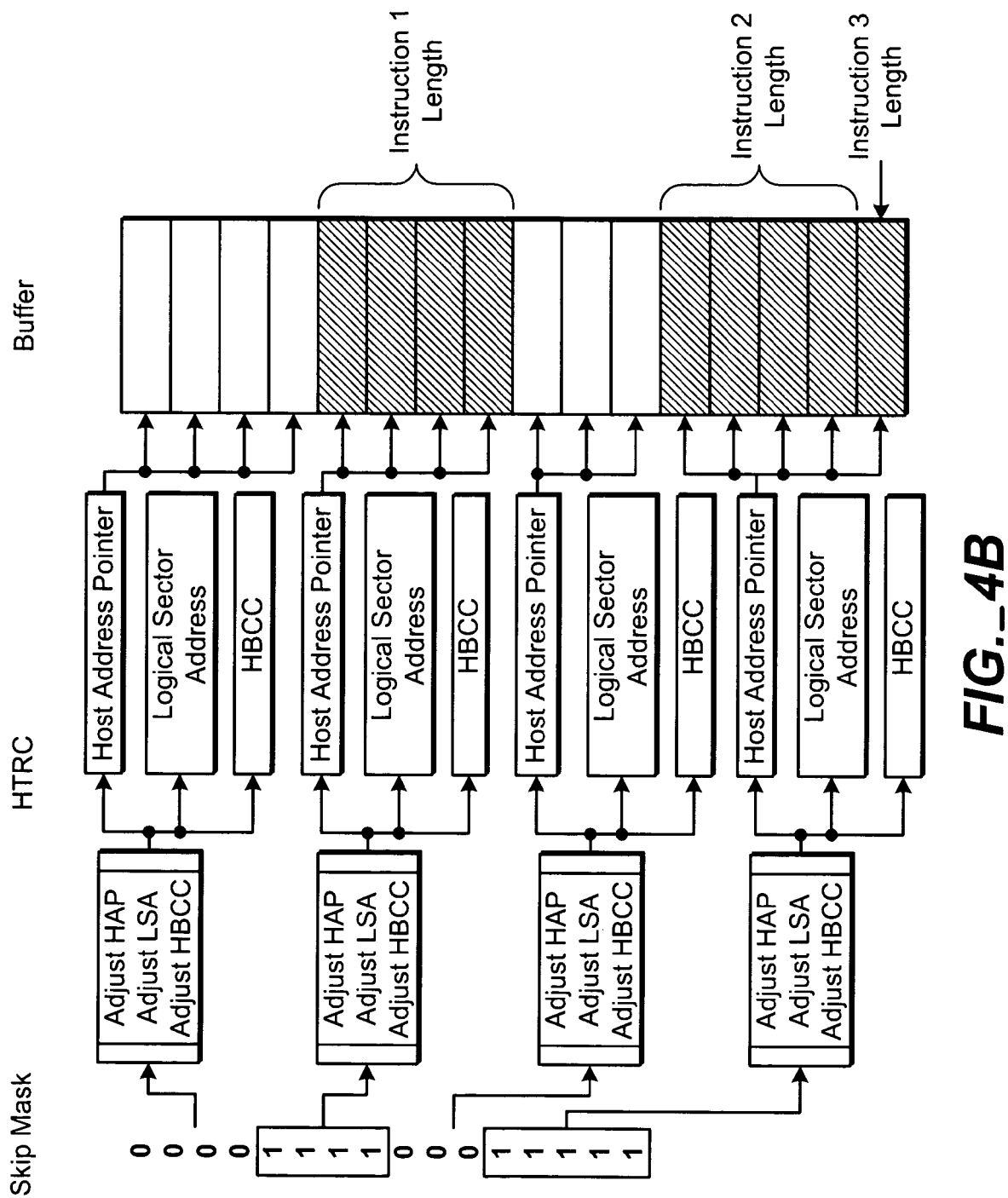

With reference now to the figures, FIG. 1 depicts a pictorial representation of a storage area network in which exemplary aspects of the present invention may be implemented. Storage area network (SAN) 100 contains SAN fabric 102, which is a combination of interconnected switches that collectively provide a routing infrastructure within SAN 100. Fabric 102 may be, for example, a fibre channel (FC) fabric or other transport technology. Alternatively, fabric 102 may simply be a protocol bus, such as a small computer system interface (SCSI) bus or, more particularly, serially attached SCSI (SAS) technology.

In the depicted example, host 112 is connected to fabric 102 via host bus adapter (HBA) 114 and host 122 is connected to fabric 102 via HBA 124. Disk drive 132 is connected to fabric 102 via disk drive controller 134. Hosts 112, 122 may be, for example, personal computers, network computers, servers, or the like. In the depicted example, hosts 112, 122 access disk drive 132 through the SAN fabric. SAN 100 may include additional hosts and/or other storage devices not shown. FIG. 1 is intended as an example, and not as an architectural limitation for the present invention.

FIG. 2 is a block diagram illustrating a disk controller in accordance with an exemplary embodiment of the present invention. The overall architecture of a disk controller is described in further detail in co-pending patent application entitled "SCALABLE ARCHITECTURE FOR CONTEXT EXECUTION," U.S. patent application Ser. No. 10/914,296, filed Aug. 9, 2004, and herein incorporated by reference. Disk drive controller 200 may be, for example, disk drive controller 134 in FIG. 1. Disk drive controller 200 includes a host side and a disk side. Disk drive controller 200 may be included in the electronics of a storage device. The storage device includes a data storage medium, such as storage disks, that is coupled to servo and read/write channel 240. On the host side, data controller 210 receives data transfer requests from one or more host devices connected by the fabric or protocol bus. On the disk side, servo read/write channel 240 moves data to or from the disk.

Servo and read/write channel 240 is coupled to a data controller 210 and a microprocessor 220. Data controller 210 is coupled to memory 230 and a peripheral bus, which is preferably part of a SAN fabric, such as fabric 102 in FIG. 1. Memory 230 is preferably a synchronous dynamic random access memory (SDRAM) based memory device and is logically divided into several segments. These segments include context buffer 232, data buffer 234, and table buffer 236. A DMA request from an HBA, such as HBA 114 or 124, is represented by a context structure within data controller 210. The context structure includes all of the information that is necessary in order for a storage controller, such a microprocessor 220 or other context management hardware in data controller 210, to program a DMA transfer from the peripheral bus through the data controller 210 to the data buffer 234, whether that transfer is a read or a write. Contexts are stored in context buffer 232. A context typically defines whether the transfer is to be a read or write to the drive, the length of the data to be transferred, and the current location of the data to be read or the space in the buffer where the data is to be written. The data to be transferred to the host (read) or transferred to the storage medium (write) is stored in data buffer 234. Tables of information are needed by data controller 200 to allow it to automate certain tasks. For example, data controller 210 needs to know a list of which sectors on the data storage medium are defective so it can skip over these locations during a transfer. These tables are kept in table buffer 236.

The general function of data controller 210 is to process commands from a requester or initiator, such as host computer 112 in FIG. 1. A host computer can be a personal computer, workstation, server, or other peripheral device. Data controller 210 performs data transfers associated to those commands with the data storage medium, e.g., magnetic or optical disk. In more detail, data controller 210 processes the commands for the associated data transfers. The commands may not request data transfers, but may request status of the storage device. Data controller 210 must also process these commands. For commands that request write data transfer, data controller 210 first transfers data from the peripheral bus to the data buffer 234, then from the data buffer 234 to the Servo and Read/Write Channel 240. For commands that request read data transfer, the data controller 210 first transfers data from the Servo and Read/Write Channel 240 to the data buffer 234, then from the data buffer 234 to the peripheral bus.

Data controller 210 may be coupled to multiple host computers or multiple host bus adapters within a single host computer. Data controller 210 may contain multiple read and write commands from these multiple sources at the same time. In this case, a context within data controller 210 can represent which host computer or host bus adapter has provided the request represented by the context. Within the description of this invention, "host computer" or "host" is used as a generic term to refer to the specific host computer or host bus adaptor that provided the read or write command represented by the current context being processed.

Different bus architectures and protocols exist for providing commands to disk drive controller 200. Such architecture and protocols are defined by, for example, advanced technology attachment (ATA), industry standard architecture (ISA), integrated drive electronics (IDE), universal system bus (USB), small computer system interface (SCSI), serially attached SCSI (SAS), and fibre channel (FC). For example, a SCSI command known as control descriptor block (CDB) includes an operational code consisting of a group code and a command code, a logical unit number, logical block addresses (LBAs) if required, a transfer length value if required and a control byte. The transfer length value specifies the number of blocks (or other data units) that are to be transferred with an associated command. The LBA specifies the location on the data storage medium where the data is to be transferred. Thus, data controller 210 must be able to at least process one of those command protocols. These commands, which request for the data controller to transfer read data or write data to or from the data storage medium, are referred to herein as direct memory access (DMA) commands.

FIG. 3 further illustrates a data controller 300, such as the data controller 210 in FIG. 2, in which exemplary aspects of the present invention may be implemented. Device 320 is referred to herein as a host thread retrieval channel (HTRC). The operation of a disk controller and, in particular, a host thread retrieval channel is described in further detail in co-pending application entitled "METHOD OF PROCESSING A CONTEXT FOR EXECUTION," U.S. patent application Ser. No. 10/910,000, filed Aug. 3, 2004, and herein incorporated by reference. HTRC 320 includes a context fetch 328 mechanism for fetching contexts from a context buffer located in buffer 350, a nexus management 324 coupled to a protocol engine 314, a read context management mechanism 322 coupled to a read context manager 312, a buffer segment sharing mechanism 330 coupled to a disk interface 318, and a write context management mechanism 326 coupled to a write context manager 316. Read context manager 312 is coupled to a read DMA (RDMA) 332 and to the protocol engine 314. Write context manager 316 is coupled to a write DMA (WDMA) 336 and to the protocol engine 314. Nexus management 324 determines whether the communications protocol connection is already established between the disk controller and the host computer. Protocol engine 314 is coupled to a bus 370, which may be, for example, a SAS bus. Buffer 350 may be, for example, memory 230 in FIG. 2.

While one HTRC is shown in the depicted example, data controller 300 may include more such devices. In an exemplary embodiment, data controller 300 may include three HTRC devices. Each HTRC 320 has buffer segment sharing mechanism 330, which contains a host buffer contents counter (HBCC) that manages the quantity of sectors in the buffer segment across the entire context list that HTRC 320 is retrieving. Thresholds are established for the HBCC. These thresholds are compared against the current value of the HBCC and used, along with other criteria, to determine when the context should be enabled to start transferring on bus 370. If the threshold is met, the length of the instruction generated by the HTRC 320 may still be for less than the size of the original length to be transferred by the context. In this case, HTRC 320 will issue more than one instruction for the context. Once it is determined that an instruction should be issued by HTRC 320, HTRC 320 adjusts the context transfer length by the size of the issued instruction, measured in sectors, and increments the cluster count register by the size of the issued instruction, again measured in sectors. When this adjustment is complete, the instruction request is asserted.

Write context manager (WCM) 316 is the interface between HTRC 320 that contains a write context and the receive instruction block in protocol engine 314. WCM 316 takes requests from HTRC 320 for write data instructions, arbitrates between the requests, asserts a receive instruction request to protocol engine 314 for the winning request, copies the instruction to WDMA 336 and passes the acknowledgement for the instruction request from protocol engine 314 back to the originating HTRC's Write Context Management 326.

The read context manager (RCM) 312 is the interface between the HTRCs containing read contexts and the transmit instruction block in protocol engine 314. RCM 312 takes requests from the HTRCs for sending read data and nexus information from protocol engine 314, arbitrates between the requests, loads the HTRC 320 instruction to RCM 312, asserts a transmit instruction request to protocol engine 314 for the winning request, copies the instruction to RDMA 332, and passes the acknowledgement for the instruction request from protocol engine 314 back to the originating HTRC's Read Context Management 322.

The read DMA (RDMA) 332 is the interface between the data transmit block in protocol engine 314, the buffer 350 and the RCM 312. The RDMA 332, once loaded with an instruction, will transfer data from the buffer segment starting at the address pointer, specified in the instruction, to the data transmit block in protocol engine 314. The data transmit block of protocol engine 314 formats this data for transmission on bus 370.

The write DMA (WDMA) 336 is the interface between the data receive block in protocol engine 314, the buffer 350 and WCM 316. The WDMA 336, once loaded with an instruction, will transfer data from the data receive block in protocol engine 314 to the buffer segment starting at the address pointer specified in the instruction. The data receive block of protocol engine 314 removes the protocol format from the data received from bus 370. WDMA 336 may include storage to hold multiple instructions, which can be switched to be active when data is received from protocol engine 314 for a given instruction pending in WDMA 336.

As WDMA 336 and RDMA 332 transfer data with a buffer segment, disk interface 318 also transfers data with the same buffer segment. On a write transfer, data is transferred in order from bus 370, to protocol engine 314 data receive block, to WDMA 336, to a data buffer, also called a buffer segment, located in buffer 350, to disk interface 318, and to data storage medium 360. On a read transfer, data is transferred in order from data storage medium 360, to disk interface 318, to a data buffer located in buffer 350, to RDMA 332, to the protocol engine 314 data transmit block, and to bus 370. The servo and Read/Write Channel 240 from FIG. 2 is located between disk interface 318 and data storage medium 360.

The HBCC is a variable that is loaded with the number of sectors available in the buffer segment for disk read operations or the amount of sectors already in the buffer for disk write operations (both are typically 0 for new read and write commands). The HBCC is decremented by the cluster count on reads and incremented by the cluster count on writes each time the HTRC 320 generates a request to the RCM 312 or WCM 316 and is incremented for reads and decremented for writes each time a sector is transferred correctly over disk interface 318 with buffer 350. The cluster count variable is the size of the data that will be transferred in response to an instruction asserted by the HTRC. The cluster count is also referred to herein as an instruction length variable.

When the HBCC equals zero for a read, the buffer segment is empty; when the HBCC equals the segment size for a write, the buffer segment is full. The segment size variable defines the size in sectors of a buffer segment. A buffer segment is the part of the total buffer that has been assigned for use by the current DMA transfer that is being managed by the HTRC. On a write, data is transferred into the buffer segment by WDMA 336. On a read, data is transferred from the buffer segment by RDMA 332. When the buffer segment is empty for reads or full for writes, the HTRC 320 is prevented from issuing further instructions to continue the DMA transfer.

In some implementations, a host may wish to perform a read from or a write to non-consecutive logical sector locations on the data storage medium 360 using a single write or read DMA request. For this purpose, a DMA request may also include a skip mask table, such as skip mask table 382. A skip mask table is a series of ones and zeroes that indicate whether consecutive sectors are to be transferred on the bus 370. The skip mask table 382 is received as part of the DMA request from the host by the protocol engine 314. The protocol engine 314 uses the write DMA 336 to place the skip mask table 382 into the buffer 350. In accordance with a preferred embodiment of the present invention, data controller 300 includes skip logic 380. The microprocessor (not shown) provides to the skip logic an address of skip mask table 382 in buffer 350 and the length of the table. HTRC 320 is programmed with a pointer to a single context thread and maintains a remaining length of the transfer for each context fetched. A context thread is a linked list of contexts that are related. Skip mask table 382 corresponds to the context thread. The total length of the transfer is the number of ones in the table.

Skip logic 380 examines skip mask table 382 and creates groups of the bits of ones and zeroes such that each group has all of the zeroes which precede a one and all the ones which follow after these zeroes. Skip logic 380 provides HTRC 320 with the number of consecutive zeroes and the number of consecutive ones from each of these groups. HTRC 320 then generates read or write instructions for each group of consecutive ones in the table. All adjustments to dynamic counters and addresses are performed within HTRC 320. HTRC 320 keeps track of the total remaining context transfer length for each context fetched from the context thread and the total remaining group transfer length for each group of ones received from skip logic 380. When a context is fetched, the remaining context transfer length is set to the transfer length from the context. As each group of consecutive zero and one bits is received from skip logic 380, the remaining group transfer length is set to the number of ones in this group.

For each instruction, HTRC 320 decrements both of these transfer lengths by the instruction length, in sectors, until one of these transfer lengths reaches zero. When the remaining context transfer length reaches zero, HTRC 320 will fetch the next context in the thread. When the remaining group transfer length reaches zero, HTRC 320 will begin to process the next group from skip logic 380.

HTRC 320 also keeps track of a host address pointer (HAP) and a logical sector address (LSA). The host address pointer points to physical addresses in buffer 350. The host address pointer is the buffer address, within the buffer segment assigned to this HTRC, where data should be transferred when the RDMA or WDMA begins to execute the next instruction which HTRC 320 will issue. The host address pointer will be included as part of the next instruction which the HTRC will issue. When a context is fetched, the context can either supply a new address to load into the host address pointer, or it can indicate to retain the current address. For each instruction, HTRC 320 increments the host address pointer by the instruction length in bytes. The logical sector address points to the next sector on the data storage medium 360 to be read from or written to. The logical sector address is provided in the DMA request from the host, in the form of the LSA, for example, and is passed to HTRC 320 in each context as the first logical sector address of the context. HTRC 320 loads its logical sector address from each context that is fetched and increments its logical sector address for each instruction.

Read context management 322 contains read release logic to support gaps in the logical sector address between contexts. The context indicates when to use the read release logic and the number of sectors to release. When a context is fetched with the indication to use the read release logic enabled, the read release logic first performs the read release operation, and then proceeds as normal to create one or more DMA instructions for the context. The read release operation adjusts the counters and pointers in HTRC 320 to discard the next read release number of sectors from the buffer segment. This discard is performed one sector at a time. As each sector is discarded, the HBCC is decremented by one and the host address pointer is incremented by one sector. If the HBCC becomes zero during the read release operation, the operation is paused until the HBCC becomes greater than zero again.

Skip table commands are treated as normal contexts with the indication to use the read skip logic disabled. A context is programmed with a total command transfer length from the host's DMA request. The skip table from the DMA request is placed into the buffer. HTRC 320 is given a pointer to the context and skip logic 380 is given a pointer to the skip table. HTRC 320 fetches the context and receives the counts of zeroes and ones from the first group processed by skip logic 380. The count of zero bits is handled first. The count of zero bits represents the number of sectors to skip before an instruction is created by HTRC 320. For all writes and reads, the logic sector address is incremented by the number of zero bits. For cached reads, the read release logic is also used to release the number of sectors from the buffer represented by the number of zero bits. Cached reads are defined herein as DMA read requests for data that is already present in the buffer with all of the data represented by both the ones and zeroes of the skip mask table 382 present in the buffer. The data represented by the skip mask table 382 zero bits needs to be discarded from the buffer and the data represented by the one bits needs to be transferred to the host. Noncached reads are defined herein as DMA read requests where only the data represented by the skip mask table 382 one bits is present in the buffer. Therefore, no data needs to be discarded from the buffer; all the data in the buffer needs to be transferred to the host.

When the number of sectors represented by the count of zero bits in the current group from skip logic 380 is skipped, then HTRC 320 can create DMA instructions. HTRC 320 waits until the number of sectors available to transfer, according to the HBCC, exceeds a threshold or until all the sectors to be transferred are ready. Then HTRC 320 creates an instruction with a transfer length set to the minimum of the remaining context transfer length, the remaining group transfer length and the number of sectors available to transfer according to the HBCC. The instruction also contains the adjusted logical sector address and host address pointer. HTRC 320 then requests to the RCM 321 or WCM 316 to process this instruction. Once an acknowledgement is received from RCM 321 or WCM 316 for this instruction, HTRC 320 receives the zero and one counts for the next group from skip logic 380 and begins to process this group.

No changes are needed to support skip tables in RCM 312, WCM 316, protocol engine 314, read DMA 332, or write DMA 336. In the preferred embodiment of the present invention, skip logic 380 is not in HTRC 320 to allow one skip logic 380 to service multiple HTRCs. Skip logic 380 may also be included in HTRC 320 to allow multiple skip mask transfers to be simultaneously active. Disk interface 318 also contains skip logic to support the skip table command. This logic is included in the prior art. Disk interface 318 skip logic accesses the same skip mask table 382 from buffer 350 to determine which sectors to transfer and which sectors to skip as data is transferred between the buffer and the data storage medium 360. Disk interface 318 skip logic must also adjust a logical sector address that is in the disk interface 318 and can optionally adjust a disk address pointer that has a similar function in the disk interface 318 as to the host address pointer and a disk buffer contents counter (DBCC) that has a similar function in the disk interface 318 as to the host buffer contents counter (HBCC). The current invention is within the skip logic 380 and HTRC 320 and is compatible with the skip logic present in disk interface 318.

FIGS. 4A and 4B illustrate example data transfers with skip mask tables in accordance with a preferred embodiment of the present invention. More particularly, FIG. 4A illustrates a write or a non-cached read. In the depicted example, a host sends the controller a skip mask DMA request for 9 sectors with a skip mask table. The microprocessor or other command handling logic creates a context for this request. The HTRC fetches the context, which has a transfer length of 9 sectors. The remaining context transfer length in the HTRC is set to the transfer length from the context, which is 9. The skip mask is "0000111100011111" with a total transfer length of nine. This table is placed into the buffer and the skip logic is given a buffer pointer to where the start of this table is located. To protect the table against a dynamic or static defect in the buffer, protection can be included in the buffer such as encoding the table with an error correction code (ECC) or with parity.

The skip logic examines the skip mask table and determines that the skip mask table begins with four consecutive zeroes followed by four consecutive ones. Therefore, the first group is four zeroes and four ones. The skip logic provides the number of zeroes, which is four, to the HTRC. The HTRC increments the LSA by four without moving data.

The HTRC next looks at the number of ones, which is four, in the first group and sets the remaining group transfer length to this number. Since the remaining group transfer length (4) is less than the remaining context transfer length (9), the maximum number of sectors for the next transfer instruction is four. The HTRC waits until the HBCC indicates that either four sectors are available in the buffer or that the number of sectors available in the buffer is greater than a threshold. In this example, assume that all of the data (reads) or space (writes) is available in the buffer except for one of the sectors requested by the host's skip mask command. The HTRC creates a first instruction to pass to the WCM or RCM with a transfer length of four. Now the HTRC increments the HAP by four sectors, increments the LSA by four, decrements the remaining group transfer length by four to zero, decrements the remaining context transfer length by four to five and decrements (reads) or increments (writes) the HBCC by four.

When the HTRC receives an acknowledgement from the RCM or WCM that the first transfer instruction has been given to the RDMA or WDMA to transfer the data, the HTRC is finished with the first transfer instruction. The HTRC detects that the remaining context transfer length is not zero, which means that there is more to transfer for the current context. The HTRC detects that the remaining group transfer length is zero, so the HTRC receives the second group from the skip logic. The second group of consecutive zeroes and ones in the skip table is three zeroes and five ones. The HTRC handles the three zeroes first and increments the LSA by three. Then the HTRC loads the number of ones into the remaining group transfer length (5). The HBCC only indicates that four sectors are available to transfer. But assume that the threshold only requires four sectors to be ready to issue an instruction, so the HBCC is greater or equal to this threshold and allows a new instruction to be created. The HTRC creates a second instruction to pass to the WCM or RCM with a transfer length of four since the HBCC only allows for four of the remaining five sectors to be transferred at this time. Now the HTRC increments the HAP by four sectors, increments the LSA by four, decrements the remaining group transfer length by four to one, decrements the remaining context transfer length by four to one and decrements (reads) or increments (writes) the HBCC by four. The HBCC now indicates that no sectors are available to transfer.

When the HTRC receives an acknowledgement from the RCM or WCM that the second transfer instruction has been given to the RDMA or WDMA to transfer the data, the HTRC is finished with the second transfer instruction. The HTRC detects that the remaining context transfer length is not zero, which means that there is more to transfer for the current context. The HTRC detects that the remaining group transfer length is not zero, so the HTRC does not need another group from the skip logic. The HTRC waits until the HBCC indicates that another sector can be transferred. Then, since all of the remaining context transfer length can be transferred, the HTRC can create a third transfer instruction with a transfer length of one sector. The HTRC increments the HAP by one sector, increments the LSA by one, decrements the remaining group transfer length by one to zero, decrements the remaining context transfer length by one to zero and decrements (reads) or increments (writes) the HBCC by one. Since the remaining context transfer length is zero, the HTRC does not receive another group from the skip logic. Instead, the HTRC ends operation or waits for another context to fetch.

Turning now to FIG. 4B, an example of a cached read is shown. Since the data is cached, both valid and skipped data is already stored in the buffer, for example, from a previous transfer. A cached read is performed in a similar manner to that of a non-cached read. The only difference is that while the HTRC is adjusting the LSA by the number of zeroes in a skip mask table group, the HTRC also performs the read release operation. As a result, the HBCC is decremented by the number of zeroes in the skip mask table group to indicate that the skipped sectors are being discarded from the buffer segment. After the skipped sectors are removed from the HBCC, the HBCC can be used as in the example for FIG. 4A. Also, the read release operation increments the HAP by a sector for each zero in the skip mask table group.

FIGS. 5A and 5B depict a flowchart, which illustrates the operation of skip logic in accordance with an exemplary embodiment of the present invention. With reference to FIG. 5A, operation begins and the skip logic receives the skip mask table for the next context thread (block 502). The skip logic receives an address for the skip mask table and a length of the table from a microprocessor and retrieves the skip mask table. Next, the skip logic initializes a ones count variable and a zeroes count variable to zero (block 504), and initializes a bit pointer variable, which points to the next bit to process in the skip mask table, to zero (block 506). The bit pointer variable now points to the first bit in the skip mask table. The ones count variable, zeroes count variable and bit pointer variable are local variables within the skip logic.

Next, the skip logic begins its first of two loops used to examine the skip mask table and extract the first group of consecutive zeros followed by consecutive ones. The first loop is to find the number of consecutive zero bits. The first loop ends and the second loop starts when a one bit is found. The second loop is to find the number of consecutive one bits which follow the consecutive zero bits. The first loop begins with the skip logic examining the next bit from the skip mask table that is pointed to by the bit pointer variable (block 508). If this bit is a zero in block 508, then the skip logic increments the zeroes count variable by 1 (block 510), increments the bit pointer variable by 1 to point to the next bit in the skip mask table (block 512) and then checks to see if the bit pointer variable is now pointing to the end of the skip mask table (block 514). The bit pointer variable is pointing to the end of the skip mask table if it is equal to the length of the skip mask table. If the end of the table is reached, then the skip logic proceeds to block 524. Otherwise, the skip logic returns to block 508 to examine the next bit.

If the bit pointed to by the bit pointer variable in block 508 is a one, then the group of consecutive zeroes has ended and the skip logic begins the second loop to look for consecutive ones by incrementing the ones count variable by 1 (block 516), incrementing the bit pointer variable by 1 to point to the next bit in the skip mask table (block 518) and then checking to see if the bit pointer variable is now pointing to the end of the skip mask table (block 520). If the end of the table is reached, then the skip logic proceeds to block 524. Otherwise, the skip logic continues to block 522 to examine the next bit. In block 522, the skip logic examines the next bit from the skip mask table that is pointed to by the bit pointer variable to determine whether the bit is a one or a zero. If the bit is a one, it represents another one in the group of consecutive ones and the skip logic returns to block 516. If the bit is a zero, the group of consecutive zeros and ones has ended and the skip logic continues to block 524.

In block 524, the skip logic waits until it sees an HTRC requesting for the next group of ones count and zeros count. Turning now to FIG. 5B, when an HTRC request is detected, the skip logic passes the value of zeroes count variable to the requesting HTRC as the zeroes count for this group (block 526), sets the zeroes count variable back to zero (block 528), and then determines whether the remaining context transfer length from the requesting HTRC is greater than or equal to the ones count variable (block 530). The remaining context transfer length is the amount of transfer length from the original context that has not yet been committed to in a transfer instruction created by the HTRC. If the requesting HTRC's remaining context transfer length is not greater than or equal to the ones count variable, then the skip logic passes the value of the requesting HTRC's remaining context transfer length to the requesting HTRC as the ones count for this group (block 532), decrements the remaining ones count variable by the requesting HTRC's remaining context transfer length (block 534), and then returns to block 524 in FIG. 5A to wait for a new request from the next context that is fetched into the HTRC. A subsequent request from the HTRC will allow the skip logic to pass more of the ones count variable over to the HTRC.

If the requesting HTRC's remaining context transfer length is greater than or equal to the ones count variable in block 530, then the skip logic passes the entire value of the ones count variable to the requesting HTRC as the ones count for this group (block 536), sets the ones count variable to zero (block 538), and then determines whether the bit pointer variable is now pointing to the end of the skip mask table (block 540). If the end of the table is reached, then the skip logic proceeds to block 542. Otherwise, the skip logic returns to block 508 in FIG. 5A to examine the next bit and prepare the next group of ones and zeroes counts. In block 542, the skip mask logic determines whether this is the last context of the thread of contexts that the HTRC is working on. If this is the last context of the thread, then operation ends. Otherwise, operation returns to block 502 in FIG. 5A to receive a new skip mask table for the next context in the context thread. Optionally, when block 540 determines that the bit pointer variable is pointing to the end of the skip mask table, operation could proceed directly to end operation in the case where the skip mask logic and/or HTRC is designed to only work on one skip mask table at a time.

Note that the skip logic is able to prepare the ones and zeroes counts in advance of the HTRC requesting, which allows for less latency in providing these counts when the HTRC requests them.

FIG. 6 is a flowchart illustrating operation of a host thread retrieval channel performing a data transfer in accordance with an exemplary embodiment of the present invention. Operation begins and the HTRC fetches the first context from the thread of contexts that is pointed to by a context thread pointer that the microprocessor initialized before starting this operation (block 602). Then, the HTRC initializes the remaining context transfer length variable, which is a local variable within the HTRC, to the transfer length from the context that was just fetched (block 604). Next, the HTRC requests the next group of ones and zeroes counts from the skip logic (block 606) and then waits until the skip logic provides both of these counts to the HTRC (block 608). The remaining context transfer length is communicated to the skip logic along with the request from the HTRC to the skip logic.

Once the zeroes and ones counts for the next group are available, the HTRC determines whether the zeroes count is greater than zero (block 610). If the zeroes count is greater than zero, then the HTRC skips over these sectors by incrementing the logical sector address variable, which is a local variable in the HTRC and is also referred to herein as the data position pointer, by the zeroes count (block 612). The logical sector address is now indicating correctly the first sector that the next transfer instruction should request to DMA. After incrementing the LSA by the zeros count in block 612, the HTRC determines whether the current configuration for this HTRC (or optionally, for the current context in the HTRC) indicates that the current operation is a read operation and that the sectors to be skipped are cached (i.e., present) in the buffer segment associated with the current HTRC's context (block 614).

If a cached read situation exists in block 614, then the HTRC decrements the host buffer contents counter by the zeros count (block 616), increments the host address pointer by the zeroes count number of sectors (block 618), and then proceeds to block 620. The result of blocks 618 and 620 is that the sectors to be skipped are no longer cached in the buffer. The HAP is pointing to the location in the buffer where the next sector after the skipped sectors is located, and the HBCC no longer includes the count of the skipped sectors. If the logic associated with the HBCC does not allow for negative numbers, block 616 may pause until the HBCC represents the full number of sectors to be skipped as indicated by the zeroes count. The HBCC may increment on reads, for example, as the disk interface 318 in FIG. 3 places additional sectors into the buffer from the data storage medium. In addition, if the disk interface 318 is transferring sectors into the same buffer segment associated with the current HTRC's context, then block 618 may also need to indicate to the disk interface 318 that the skipped sectors are no longer in the buffer. This allows the disk interface to see this area of the buffer as empty and to possibly backfill this area with other sectors. The HBCC and HAP are local variables within the HTRC.

If block 610 determines that the zeroes count is not greater than zero, then there are no sectors to skip in this skip logic group, so the HTRC proceeds to block 620. If block 614 determines that a cached read situation does not exist, then the HTRC proceeds to block 620. In block 620, the HTRC loads the remaining group transfer length, which is a local variable in the HTRC, with the value of the ones count received from the skip logic. Then the HTRC waits until the HBCC allows a new transfer instruction (block 622). Many criteria can be used to make this determination. In one preferred embodiment, one of these two conditions must be satisfied: the HBCC indicates that a threshold amount of data or space is available in the buffer such that the system performance will be optimal if a connection on the protocol bus is opened and this much data is transferred; or, all of the data that is possible to transfer at this moment, as indicated by the remaining group transfer length, can be transferred, as indicated by the amount of data or space that is available as indicated by the HBCC. Note that the remaining group transfer length is less than or equal to the remaining context transfer length (this was accomplished in the skip logic operation).

Once the HBCC allows a new transfer instruction in block 622, the HTRC determines an instruction transfer length to use (block 624). Many criteria can be used to make this determination. In the preferred embodiment, the instruction transfer length is determined as the minimum of the remaining group transfer length and the amount of data or space available in the buffer according to the HBCC. Then the HTRC creates an instruction which includes transfer characteristics such as the current state of the HTRC's HAP, the current state of the HTRC's LSA, the determined instruction transfer length, and other information that the context or HTRC needs to communicate to the DMA for performing the transfer represented by the instruction. This instruction is passed to the appropriate DMA and/or protocol engine (block 626), using a request/acknowledgement handshake, to execute the instruction by transferring the data represented by the instruction. In the preferred embodiment, RCM 312 (for a read) or WCM 316 (for a write) performs the operation of passing the instruction to the protocol engine and to the RDMA (for a read) or WDMA (for a write).

Once the instruction has been passed, the HTRC adjusts the HBCC by the instruction's transfer length to indicate that there is less data or space available in the buffer for further instructions (block 628) and increments the HAP and the LSA by the instruction's transfer length (block 630). Thereafter, the HTRC decrements the remaining context transfer length and the remaining group transfer length by the instruction's transfer length (block 632) and then determines whether the remaining context transfer length is equal to zero (block 634). If the remaining context transfer length is equal to zero, then the HTRC has finished issuing instructions for the current context and the HTRC proceeds to block 638. Otherwise, the current context still represents more data to transfer and the HTRC proceeds to block 636. In block 636, the HTRC determines whether the remaining group transfer length is equal to zero. If the remaining group transfer length is equal to zero, then the HTRC needs a new group from the skip logic and the HTRC returns to block 606. Otherwise, the HTRC still has some of the ones count from the last group available and the HTRC returns to block 622 to issue another instruction. In block 638, the HTRC determines whether the current context is the last context of the context thread associated with this HTRC. If this is the last context of the thread, then operation ends. Otherwise, the HTRC returns to block 602 to fetch a new context.

This operation assumes that the read release feature does not exist in the HTRC. If the read release feature exists, then if a context indicates to use this feature, the read release requested by the context can occur between blocks 602 and 604. In addition, the read release feature could be used to perform the functions of blocks 616 and 618 to save the cost of new functions to implement the skip mask operation.

Thus, the present invention solves the disadvantages of the prior art by providing skip logic within a data controller that evaluates a skip table and allows the hardware to perform a DMA data transfer without requiring that a DMA with skip table request from the host be divided into multiple contexts whose transfer lengths are at the boundary of the one/zero transitions from the skip mask table. The use of hardware to determine the length of one and zero groupings in the skip mask table allows a single context to be used to perform data transfer with skipped data locations. The microprocessor can program only one context that covers the whole table and the skip logic manages the transfer of valid data while skipping irrelevant data or positions. Optionally, the microprocessor can also divide the context in any way that is convenient independent from the one/zero boundaries in the skip mask table. Therefore, the present invention achieves a significant performance advantage because the microprocessor does not have to process the skip mask table to create contexts to represent the DMA request.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and the practical application and to enable others of ordinary skill in the art to understand the invention for various embodiments with various modifications as are suited to the particular use contemplated.

What is claimed is:

1. In a data controller comprising a retrieval channel, a method of automatically generating contexts, the method comprising:

processing a skip mask table received in a direct memory access (DMA) request command to generate a number of groups of consecutive ones and groups of consecutive zeros;

determining one or more contexts from each generated group of consecutive ones;

fetching, through the retrieval channel, the determined context; and creating, in the retrieval channel, one or more direct memory access transfer instructions for each group of consecutive ones and zeroes, wherein a length of each direct memory access transfer instruction is based on a count of ones and zeroes in a corresponding group of ones and zeroes, an amount of data or space that is available in a buffer, and a corresponding context's transfer length.

2. The method of claim 1, wherein the step of creating one or more direct memory access transfer instructions in the retrieval channel includes:

processing each group of ones and zeroes in order and one at a time and processing each context in order and one at a time;

determining a number of consecutive zeroes in a given group;

adjusting a data position counter based on the number of consecutive zeroes to skip one or more data locations;

determining a number of consecutive ones in the given group;

determining an instruction transfer length as a minimum of the number of consecutive ones in the group, the amount of data or space that is available in the buffer, and a remaining transfer length for a context which has not yet been represented by an instruction;

generating a data transfer instruction having the instruction transfer length; and adjusting a data position counter based on the instruction transfer length.

3. The method of claim 2, further comprising:
decrementing the remaining transfer length for the context by the instruction transfer length.

4. The method of claim 3, further comprising:
determining whether each context is complete by determining whether the remaining transfer length for the context is zero.

5. The method of claim 2, further comprising:
determining a number of valid data positions;
decrementing the number of valid data positions by the instruction transfer length if the direct memory access command is a read request; and
incrementing the number of valid data positions by the instruction transfer length if the direct memory access command is a write request.

6. The method of claim 5, further comprising:
decrementing the number of valid data positions by the number of zeroes in the group if the direct memory access request is a cached read request.

7. The method of claim 2, further comprising:
determining a memory address to which data for the instruction should be transmitted or from which data should be received; and
adjusting the memory address by a number of sectors represented by the instruction transfer length.

8. The method of claim 7, further comprising:
adjusting the memory address by the number of zeroes in the group if the direct memory access request is a cached read request.

9. The method of claim 7, wherein the memory address is a host address pointer.

10. The method of claim 2, wherein the data position counter is a logical sector address.

11. The method of claim 2, further comprising:
presenting the data transfer instruction to a protocol engine.

12. The method of claim 2, further comprising:
initializing, when a fetched context is fetched, a remaining context transfer length to a transfer length of the fetched context;
creating one or more instructions to represent multiple groups of ones and zeroes without fetching a new context;
decrementing the remaining context transfer length by an instruction transfer length of each instruction that is created; and
fetching a new context when the remaining context transfer length becomes zero.

13. The method of claim 2, further comprising:
creating at least one instruction to represent a remaining transfer length of a context which is not equal to the count of consecutive ones in a current group of ones and zeroes;
decrementing the number of consecutive zeroes in the current group to zero;
decrementing the number of consecutive ones in the current group by the instruction transfer length to form a modified group;
fetching a new context; and
using a count of ones in the modified group to calculate a next instruction transfer length.

14. An apparatus in a data controller that automatically generates contexts, the apparatus comprising:
means for processing a skip mask table received in a direct memory access command to generate a number of groups of consecutive ones and groups of consecutive zeros;
means for determining one or more contexts from each generated groups of consecutive ones in the skip mask table;
means for fetching, through a retrieval channel of the data controller, the determined context; and
means for creating, in the retrieval channel, one or more direct memory access transfer instructions for each group of consecutive ones and zeroes, wherein a length of each direct memory access transfer instruction is based on a count of ones and zeroes in a corresponding group of ones and zeroes, an amount of data or space that is available in a buffer, and or a corresponding context's transfer length.

15. The apparatus of claim 14, wherein the means for creating one or more direct memory access transfer instructions in the retrieval channel includes:
means for processing each group of ones and zeroes in order and one at a time and processing each context in order and one at a time;
means for determining a number of consecutive zeroes in a given group;
means for adjusting a data position counter based on the number of consecutive zeroes to skip one or more data locations;
means for determining a number of consecutive ones in the given group;
means for determining an instruction transfer length as a minimum of the number of consecutive ones in the group, the amount of data or space that is available in the buffer, and a remaining transfer length for a context which has not yet been represented by an instruction;
means for generating a data transfer instruction having the instruction transfer length; and
means for adjusting a data position counter based on the instruction transfer length.

16. The apparatus of claim 15, further comprising:
means for decrementing the remaining transfer length for the context by the instruction transfer length.

17. The apparatus of claim 16, further comprising:
means for determining whether each context is complete by determining whether the remaining transfer length for the context is zero.

18. The apparatus of claim 15, further comprising:
means for determining a number of valid data positions;
means for decrementing the number of valid data positions by the instruction transfer length if the direct memory access command is a read request; and
means for incrementing the number of valid data positions by the instruction transfer length if the direct memory access command is a write request.

19. The apparatus of claim 18, further comprising:
means for decrementing the number of valid data positions by the number of zeroes in the group if the direct memory access request is a cached read request.

20. The apparatus of claim 15, further comprising:
means for determining a memory address where data for the instruction should be moved to or from; and
means for adjusting the memory address by a number of sectors represented by the instruction transfer length.

21. The apparatus of claim 20, further comprising:
means for adjusting the memory address by the number of zeroes in the group if the direct memory access request is a cached read request.

22. The apparatus of claim 20, wherein the memory address is a host address pointer.

23. The apparatus of claim 15, wherein the data position counter is a logical sector address.

24. The apparatus of claim 15, further comprising:
means for presenting the data transfer instruction to a protocol engine.

25. The apparatus of claim 15, further comprising:
means for initializing, when a fetched context is fetched, a remaining context transfer length to a transfer length of the fetched context;
means for creating one or more instructions to represent multiple groups of ones and zeroes without fetching a new context;
means for decrementing the remaining context transfer length by an instruction transfer length of each instruction that is created; and
means for fetching a new context when the remaining context transfer length becomes zero.

26. The apparatus of claim 15, further comprising:
means for creating at least one instruction to represent a remaining transfer length of a context which is not equal to the count of consecutive ones in a current group of ones and zeroes;
means for decrementing the number of consecutive zeroes in the current group to zero;
means for decrementing the number of consecutive ones in the current group by the instruction transfer length to form a modified group;
means for fetching a new context; and
means for using a count of ones in the modified group to calculate a next instruction transfer length.

27. A data controller of a storage drive, the data controller comprising:
- a protocol engine that receives a skip mask table in a direct memory access request;
- a retrieval channel device that converts the direct memory access command into one or more contexts, wherein the retrieval channel device does not require upon conversion that individual transfer lengths, except for the end of the final context for the command, align with one/zero group boundaries of the skip mask table; and
- a skip logic device that divides the skip mask table into groups of consecutive ones and zeroes,
- wherein the retrieval channel device creates one or more direct memory access transfer instructions for each group of consecutive ones and zeroes, wherein a length of each direct memory access transfer instruction is based on a count of ones and zeroes in a corresponding group of ones and zeroes, an amount of data or space that is available in a buffer, and/or a corresponding context's transfer length.

28. The apparatus of claim 27, wherein the skip logic device processes each group of ones and zeroes in order and one at a time, processes each context in order and one at a time, determines a number of consecutive zeroes in a given group, and determines a number of consecutive ones in the given group; and
- wherein the retrieval channel device adjusts a data position counter based on the number of consecutive zeroes to skip one or more data locations, determines an instruction transfer length as a minimum of the number of consecutive ones in the group, the amount of data or space that is available in the buffer, and a remaining transfer length for a context which has not yet been represented by an instruction, generates a data transfer instruction having the instruction transfer length, and adjusts a data position counter based on the instruction transfer length.

29. The apparatus of claim 28, wherein the retrieval channel device decrements the remaining transfer length for the context by the instruction transfer length.

30. The apparatus of claim 29, wherein the retrieval channel device determines whether each context is complete by determining whether the remaining transfer length for the context is zero.

31. The apparatus of claim 28, wherein the retrieval channel device determines a number of valid data positions, decrements the number of valid data positions by the instruction transfer length if the direct memory access command is a read request, and increments the number of valid data positions by the instruction transfer length if the direct memory access command is a write request.

32. The apparatus of claim 31, wherein the retrieval channel device decrements the number of valid data positions by the number of zeroes in the group if the direct memory access request is a cached read request.

33. The apparatus of claim 28, wherein the retrieval channel device determines a memory address where data for the instruction is moved to or from and adjusts the memory address by a number of sectors represented by the instruction transfer length.

34. The apparatus of claim 33, wherein the retrieval channel device adjusts the memory address by the number of zeroes in the group if the direct memory access request is a cached read request.

35. The apparatus of claim 33, wherein the memory address is a host address pointer.

36. The apparatus of claim 28, wherein the data position counter is a logical sector address.

37. The apparatus of claim 28, wherein the retrieval channel device presents the data transfer instruction to a protocol engine.

38. The apparatus of claim 28, wherein, when a fetched context is fetched, the retrieval channel device initializes a remaining context transfer length to a transfer length of the fetched context, and wherein the retrieval channel device further creates one or more instructions to represent multiple groups of ones and zeroes without fetching a new context, decrements the remaining context transfer length by an instruction transfer length of each instruction that is created, and fetches a new context when the remaining context transfer length becomes zero.

39. The apparatus of claim 28, wherein the retrieval channel device creates at least one instruction that represents a remaining transfer length of a context which is not equal to the count of consecutive ones in a current group of ones and zeroes, decrements the number of consecutive zeroes in the current group to zero, decrements the number of consecutive ones in the current group by the instruction transfer length to form a modified group, fetches a new context, and uses a count of ones in the modified group to calculate a next instruction transfer length.

* * * * *